United States Patent
Bogdanowicz et al.

(10) Patent No.: US 7,380,836 B2
(45) Date of Patent: Jun. 3, 2008

(54) CONNECTION DEVICE FOR FLUID LINES

(75) Inventors: Grzegorz Bogdanowicz, Ostfildern (DE); Jakob Brenner, Esslingen (DE)

(73) Assignee: Festo AG & Co., Esslingen (DE)

( * ) Notice: Subject to any disclaimer, the term of this patent is extended or adjusted under 35 U.S.C. 154(b) by 39 days.

(21) Appl. No.: 11/215,269

(22) Filed: Aug. 30, 2005

(65) Prior Publication Data
US 2006/0061101 A1 Mar. 23, 2006

(30) Foreign Application Priority Data
Sep. 20, 2004 (DE) ............... 10 2004 046 548

(51) Int. Cl.
*F16L 35/00* (2006.01)
(52) U.S. Cl. ............... 285/39; 285/322; 285/323; 285/307; 285/308
(58) Field of Classification Search ............ 285/124.1, 285/124.2, 124.3, 124.4, 322, 323, 324, 319, 285/307, 308
See application file for complete search history.

(56) References Cited

U.S. PATENT DOCUMENTS

| 4,089,549 | A | * | 5/1978 | Vyse et al. ............... 285/124.4 |
| 5,098,241 | A | | 3/1992 | Aldridge et al. |
| 5,673,945 | A | * | 10/1997 | Olson ...................... 285/322 |
| 6,174,002 | B1 | * | 1/2001 | Rho ........................ 285/340 |
| 6,447,019 | B1 | * | 9/2002 | Hosono et al. .......... 285/148.19 |
| 6,869,109 | B2 | * | 3/2005 | Matsushita ................ 285/308 |
| 7,063,359 | B2 | * | 6/2006 | Vallee ....................... 285/319 |
| 2002/0140226 | A1 | * | 10/2002 | Salomon-Bahls ........... 285/307 |
| 2003/0001383 | A1 | * | 1/2003 | Halama ..................... 285/39 |

FOREIGN PATENT DOCUMENTS

| DE | 39 05 722 C2 | 7/1990 |
| DE | 201 19 713 U1 | 4/2002 |
| DE | 101 62 658 A1 | 7/2003 |
| EP | 0 600 201 A1 | 6/1994 |
| EP | 0 711 946 A1 | 5/1996 |
| GB | 2 080 467 A | 2/1982 |
| GB | 2 085 992 A | 5/1982 |

* cited by examiner

*Primary Examiner*—David Bagnell
*Assistant Examiner*—Jay R Ripley
(74) *Attorney, Agent, or Firm*—Hoffmann & Baron, LLP

(57) ABSTRACT

A connection device for fluid lines has a housing in which at least one housing recess is formed stepped in the longitudinal direction and merging at an inner end thereof with a fluid duct. An attachment means is fixed in the housing recess and defines a passage opening rendering possible the plugging into position of a fluid line to be connected. A sealing ring is associated with said attachment means. The sealing ring has an inner periphery matching the outline of the fluid line to be connected and being penetrated by the fluid line when connected. A centering section of the housing recess is located axially within the attachment means. An adapter ring is provided able to be inserted into the centering section for bridging over any radial intermediate space present between the outer periphery of the line's end section and the inner periphery of the centering section.

16 Claims, 2 Drawing Sheets

CONNECTION DEVICE FOR FLUID LINES

BACKGROUND OF THE INVENTION

The invention relates to a connection device for fluid lines comprising a housing in which at least one housing recess is formed stepped in the longitudinal direction and merging at an inner end thereof with a fluid duct, an attachment means being fixed in the housing recess and defining a passage opening rendering possible the plugging into position of a fluid line, which is to be connected, such attachment means being provided with a sealing ring having an inner periphery matching the outline of the fluid line to be connected, such sealing ring furthermore having such connected fluid line extending through it, a centering section of the housing recess being located axially within the attachment means, into which centering section the end section of the connected fluid line extends with a simultaneous transverse supporting action.

THE PRIOR ART

A known connection device of this type described in the German patent publication 10,162,658 A1 has a housing with a stepped recess therein, in which a tubular attachment means, having an axially, internally preceding sealing ring, is installed. A fluid line to be connected is inserted through the attachment means and the adjoining sealing ring until its end section protrudes from the sealing ring and fits into a centering section, whose inner diameter is matched to suit the external diameter of the line's end section, of the housing recess. Owing to the matching diameters in the centering section the line's end section is transversely supported by the housing, something which stabilizes its position in relation to the preceding sealing ring and furthermore steadies it, if outside the connection device transverse forces act on the fluid line.

A similar arrangement, in the case of which however the housing of the connection device, unlike the case of the said German patent publication 10,162,658 A1, is not directly constituted by a fluid power device but represents an independent component, is described in the German patent publication 3,905,722 C2.

In both designs it is necessary to employ specially adapted housings for securing fluid lines with different diameters. Accordingly different types of housings must be available if there is to be the option of selectively connecting fluid lines of different diameter. It is particularly problematical in the case of structures with housings are an integral part of fluid power device, for instance a valve, which may often have a relatively complex configuration and involve a correspondingly large amount of manufacturing complexity.

SHORT SUMMARY OF THE INVENTION

One object of the invention is to suggest measures rendering possible an economic connection of fluid lines having different diameters.

In order to achieve these and/or other objects appearing from the present specification, claims and drawings, in the present invention the connection device of the type initially mentioned is provided with an adapter ring able to be inserted into the centering section, and which bridges over any radial intermediate space, dependent on the outer diameter of the fluid line, between the outer periphery of the line's end section and the inner periphery of the centering section.

Accordingly it is possible in a comparatively simple manner to provide an adjustable possibility of connection for fluid lines of different outer diameter. Preferably for the production of the housing recess the dimensions of the centering section will be so selected that its inner diameter is equal to the outer diameter of the fluid lines which within a group of different fluid lines has the largest outer diameter. In order to connect this fluid line it is possible to dispense with the insertion of an adapter ring, since in this case the inner periphery of the centering section itself is directly responsible for transversely supporting the line's end section. If on the other hand a fluid line with a smaller outer diameter is to be connected, then this is possible with the same housing recess, it only being necessary, to ensure a transverse support of the line's end section, to previously insert an adapter ring with a suitable wall thickness into the centering section. In this case the transverse support by the housing for the line's end section is not directly by the centering section itself but rather by the intermediately placed adapter ring. For securely fixing and sealing the fluid lines to be connected it is admittedly as a rule necessary to have attachment means and sealing rings matching different line diameters available, which are then selected for use. The provision of such components is however substantially more expedient than the additional reliance on different housing types. This is more particularly the case since the outer dimensions may in each case be adhered to and the necessary measures for adaptation may be limited to selecting the internal diameter.

Further advantageous developments of the invention are defined in the claims.

The sealing ring is preferably placed so as to axially precede the attachment means internally and is in sealing contact with the wall of the housing recess. It is in this manner that the seal between the inserted fluid line and the housing may be provided using only one sealing ring.

The recess section accommodating the sealing ring will preferably have a larger cross section than the centering section that preferably directly adjoins the above mentioned recess section.

It would be admittedly possible to so design the sealing ring and the attachment means that they constitute a coherent subassembly. However more especially for reasons of adaptation in production and provision of the individual components it is advantageous if the sealing ring is not directly fixed to the attachment means.

The adapter ring may be a component which is independent of the sealing ring. More particularly as regards the production and stock keeping of parts there are however advantages if the two rings are combined together as a structural unit, termed a seal and adapter component in the following.

The combination furthermore offers the advantage that during of the production of the structural unit a simultaneous adaptation of the internal diameter of the sealing ring and of the adapter ring to the external diameter of the fluid line to be connected is possible.

In the case of a convenient design of the invention the adapter ring has, when the fluid line end section is not inserted, a configuration conically tapering toward the free end inserted into the sealing ring. Accordingly the insertion of the adapter ring into the centering recess is simplified. The wedge-like annular gap present after such plugging or insertion for assembly between the outer periphery of the adapter ring and the inner periphery centering section is obliterated during the following plugging in of the fluid line, because the line widens the adapter ring, which preferably possesses rubber-like elastic properties, until there is engagement with the inner periphery of the centering section.

The housing of the connection device can be an integral component of a fluid power device and more especially designed as a single structural unit with the device's housing. Several housing recesses may be provided in the one and the same housing more particularly in the case of such a design, which are identical with each other in design and independently of each other are able to be employed, in connection with fluid lines with a suitable diameter, with or without an inserted adapter ring, for producing the connection device.

The attachment means preferably possesses a support sleeve fixed in the housing recess coaxially and associated with a holding ring through which the connected fluid line extends so that it engages the fluid line at the outer periphery and holds it. In order to produce a readily released connection with the fluid line the support sleeve may be provided with a release sleeve axially sliding in relation to it and able to be actuated from the outside in an axial direction in order to thrust it against the holding ring and accordingly to interrupt its holding grip on the inserted fluid line.

A design structure of the connection device is found to be particularly advantageous in which the attachment means is releaseably fixed in the housing recess. Such releasable fixing function may be produced using a releaseably held support sleeve of the above described type, if same is present. The support sleeve may for example may be secured in position by a screw connection or by axially plugging in followed fixing a retaining clamp in the housing recess. Owing to the releasability of the connection there is a simple possibility of substitution, when modification is necessary for the purpose of connection of a fluid line with a different external diameter.

Further advantageous developments and convenient forms of the invention will be understood from the following detailed descriptive disclosure of two embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
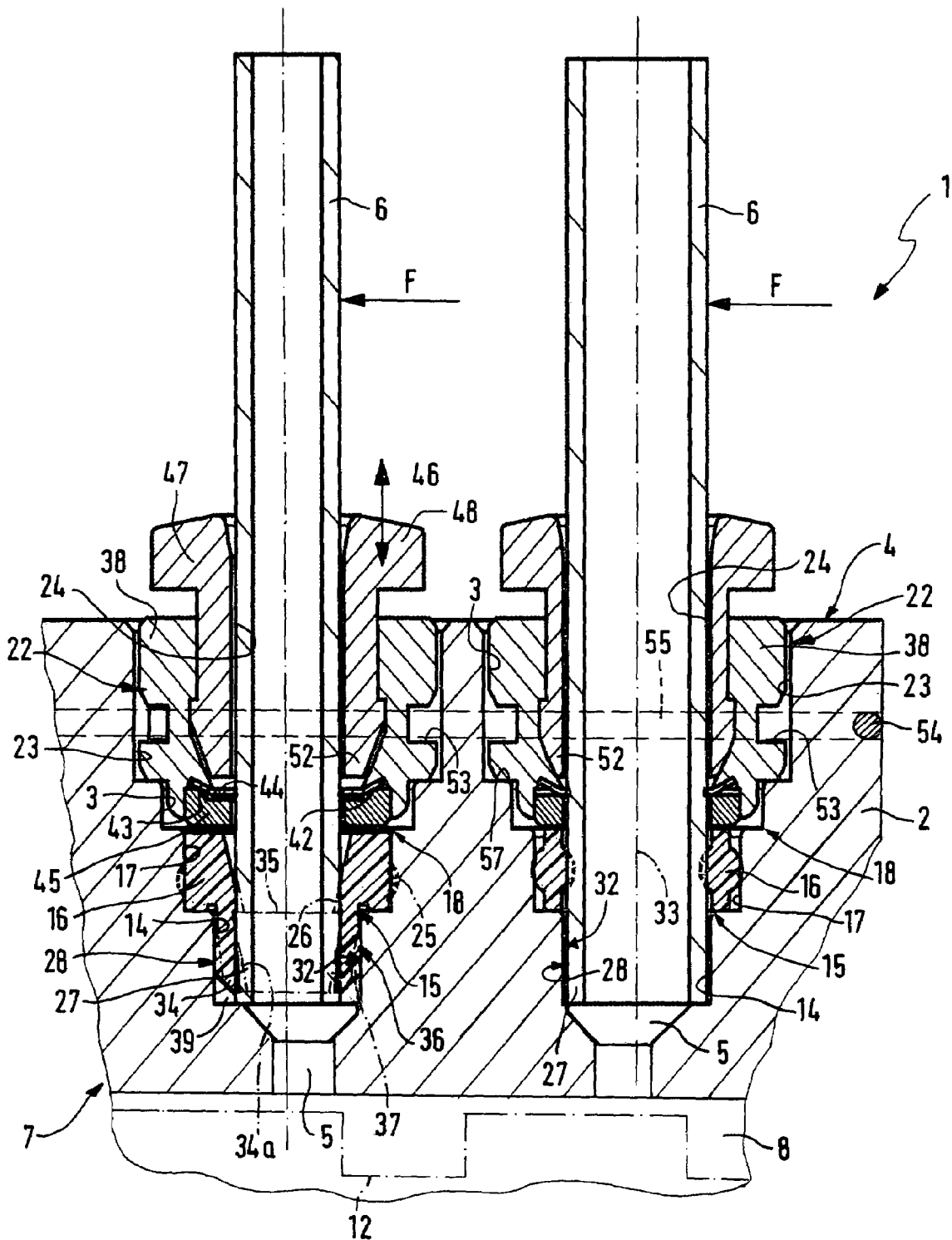
FIG. 1 shows one possible embodiment of the connection device in accordance with the invention in a longitudinal section.

The connection devices generally referenced in the drawing as 1 respectively comprise a housing 2 in which two housing recesses 3 are formed which have a linear extent and are stepped in the axial direction. Alternatively the housing 2 could comprise more than three housing recesses or only one housing recess.

The housing recesses 3 have outer open ends at an outer face 4 of the housing 2. Their opposite inner ends merge with a preferably axially aligned fluid duct 5 (providing an extension) in the housing 2. The connection device 1 renders possible the connection of a fluid line 6 with each of such fluid ducts 5, such fluid line being a rigid piece of pipe or preferably a flexible hose.

In the working embodiment illustrated in FIG. 1 the housing 2 is an integral component of a fluid power device 7 that here as an example is in the form of a valve serving for control of fluid flows. Preferably the housing 2 of the fluid power device 7 also directly constitutes the housing 2 of the connection device 1. Accordingly extremely compact dimensions are possible.

The fluid power device 7 depicted in FIG. 1 possesses a partially shown receiving chamber 8 in which a moving valve member 12 indicated in chained lines is arranged. The fluid ducts 5 extending from the housing recesses 3 open laterally into the receiving chamber 8 and may, dependent on the setting of the valve member 12, be linked with each other and with further valve ducts (not illustrated) in different manners for fluid power transmission.

Figure 2:
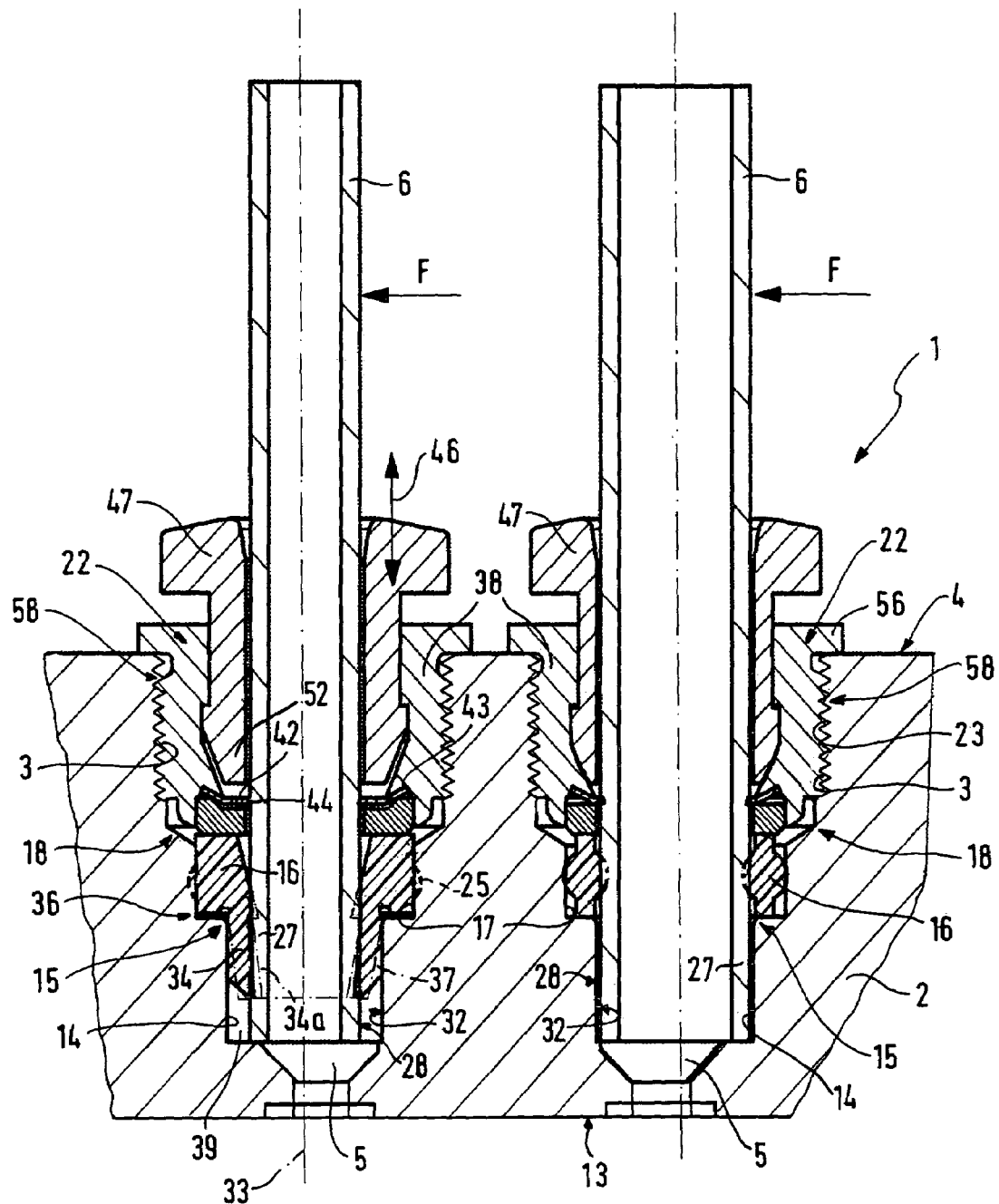
FIG. 2 shows a possible further embodiment of the connection device of the invention, also in longitudinal section.

In the case of the working example of FIG. 2 the housing 2 is a self-contained or independent component that has an interface 13 by way of which it can be connected with or mounted on a further component, not illustrated, with which the fluid lines 6 are to be connected. This further component may be for example a valve or a drive operated by fluid power.

Owing to the above mentioned axially succeeding steps in the inner diameter or bore of the housing recesses 3 same are divided up into several recess sections, whose diameter is reduced in the longitudinal direction of the housing recess 3 from the outside to the inside.

The recess section lying farthest to the inside in the axially inward direction defines the portion with the minimum inner diameter of the housing recesses 3. It is cylindrically fashioned and will be termed the centering section 14.

The centering section 14 is adjoined in an axially outward direction and by way of a first step 15 with an also cylindrically formed further housing section, in which a sealing ring 16 is placed and which therefore will be termed a seal receiving section 17. Its diameter is larger than that of the centering section 14.

By way of a further step 18 the seal receiving section 17 is adjoined by a recess section with a still larger diameter in which an attachment means, generally referenced 22, for the fluid line 6 to be connected is held and which therefore will be termed the attachment section 23.

The attachment means 22 possesses a coaxial, continuous passage opening 24, whose diameter is essentially equal to that of the fluid line 6 to be connected. The sealing ring 16 is arranged to directly axially precede the attachment means 22 in an inward direction and is seated with a certain pre-loading force or bias in the seal receiving section 17 so that it is in sealing contact with the wall of the housing recess 3.

Preferably the sealing ring 16 bears a peripheral sealing bead 25 on its outer periphery which is subject to deformation when the sealing ring 16 is inserted into the seal receiving section 17, for which reason it is merely marked in chained lines in the drawing.

The sealing ring 16 possesses an inner periphery matching the outer periphery of the fluid line 6 to be connected. In this respect the sealing ring 16 preferably has a peripherally extending seal projection 26 which, when the fluid line 6 is not connected, projects radially inward, which is thrust radially outward by the insertion of the fluid line 6 so that it engages the outer periphery of the fluid line 6 with a radial bias. In the drawing the annular seal projection 26 is therefore only depicted in chained lines.

A connected fluid line 6 extends through the attachment means 22 and the adjoining sealing ring 16 and its free line end 27 extends into the centering section 14. Here the line's end section 27 is subject directly or indirectly to a transverse supporting action of the housing 2 so that the line's end section 27 can not move out of the way to the side. Even when a transverse force F were to be applied to the fluid line section lying outside the attachment means 22, such transverse supporting action would prevent any uncontrolled transverse displacement as regards the sealing ring 16 so that the latter is at all times reliably in sealing engagement with an outer periphery of the fluid line 6 and the inner periphery of the seal receiving section 17.

The two embodiments share the feature in common that a fluid line 6 is connected with the housing recess 3 on the left and the external diameter of such line is at least essentially equal to the internal diameter of the centering section 14. A minimized gap is possible in order when installing the fluid line 6 to facilitate its introduction into the centering section 14. In this scenario the line's end section 27 is supported directly by the inner periphery 32 of the centering section 14 circumferentially at a right angle to the longitudinal axis 33 of the fluid line and transverse movements in relation to the housing 2 are prevented.

The measures in accordance with the invention render it possible to connect a fluid line 6 with a smaller outer diameter to an identically formed housing recess 3 as is illustrated in FIGS. 1 and 2, see the fluid line 6 shown respectively on the left.

For this purpose an attachment means 22 is placed, which is only modified as regards the diameter of the passage opening 24. The diameter is reduced for adaptation to the reduced diameter of the fluid line 6 to be connected.

Furthermore into the seal receiving section 17 a sealing ring 16 is inserted whose inner diameter is also reduced to match the reduced external diameter of the fluid line 6.

Additionally an adapter ring 34 is inserted into the centering section 14 coaxially, such ring bridging over an otherwise present annular radial intermediate space between the inner periphery 32 of the centering section 14 (which remains unchanged) and the outer periphery 28 of the line section 27, whose diameter is reduced.

The adapter ring 34 surrounds the line's end section 27 coaxially and constitutes an annular support element, which transmits the radial support force between the housing 2 and the line's end section 27 so that the line's end section 27 is supported all round in a radial direction despite the external diameter which is reduced in relation to the centering section 14.

It is readily possible to provide several adapter rings 34 whose external diameters are identical and only differ as regards the inner diameter from each other and which may be selectively placed in the centering section 14 in a manner dependent on the external diameter of the fluid line 6 currently to be connected.

The sealing ring 16 and the adapter ring 34 may be separate components to be employed independently of one another, as is indicated in FIG. 1 by the dividing chained lines 35. Since however normally the inner diameter of the sealing ring 16 and of the adapter ring 34 have a set relationship to each other, it is considered to be more advantageous for the sealing ring 16 and the adapter ring 34 to be united together as a unified component as is indeed the case with the two embodiments. This unified component is in the following referred to a seal and adapter component 36.

In the case of such a design too there may be a selection of different materials, if needed, for the two rings 16 and 14. This will apply even for an embodiment of the two rings 16 and 34 united together in an integral manner and produced using a twin component injection molding method. In the working embodiment the two rings 16 and 34 consist of a material with rubber-elastic properties and more particularly an elastomeric material, the same material preferably being selected and the seal and adapter component 36 representing in all a single piece component.

In the case of all working examples the sealing ring 16 is a component separate from the attachment means 22, which is not secured to the attachment means 22. The sealing ring 16 seated in the seal receiving section 17 is only acted upon axially by the attachment means 22 and accordingly held in position.

In the case of an embodiment, not illustrated here in detail, the sealing ring 16 is secured to the attachment means 22 and may accordingly placed in position in the housing recess 3 or removed therefrom.

If a seal and adapter component 36 is in position the adapter ring 34 will preferably project as a sort of collar away from the sealing ring 16 which here has a larger external diameter. The axial depth of fitting within the housing recess 3 is predetermined by ensuring that the seal and adapter component 36 has its sealing ring 16 in engagement with the first step 15. The length of the adapter ring 14 is power somewhat less than that of the centering section 14 so that between the free end face of the adapter ring 34 and the opposite inner end face of the housing recess 3 there is preferably at least an axially extending small intermediate space 39.

The adapter ring 34 could be made so dimensionally stable that it would be have cylindrical inward and outer peripheries even without the fluid line 6 inserted. The fitting by insertion into the centering section 14 is however facilitated if the external diameter of the adapter ring 34 at least toward its free end face is smaller, without the fluid line 6 being inserted, than the inner diameter of the centering section 14 and the finally desired configuration in use is produced on introduction of the fluid line 6 since same stretches the adapter ring 34 and widens it as far as engagement with the inner periphery 32 of the centering section 14.

To put this principle into practice the adapter ring 34 is so configured in the working example that without the line's end section 27 being inserted the adapter ring 34 has a shape tapering toward the free end face conically both as regards the outer periphery and the inner periphery as is indicated in chained lines in the drawing at 34a. As long as the fluid line 6 to be connected is not yet inserted an annular gap 37 will result between the outer periphery of the adapter ring and the inner periphery 32 of the intermediate section 14, such gap being wedge-like and tapering toward the sealing ring 16. The conical form of the inner periphery of the adapter ring 34 is so selected that the minimum or narrowest inner diameter is smaller than the outer periphery of the line's end section 27 approximately by an amount equal to the radial width of the annular gap 37.

If now during the connection operation the fluid line 6 is introduced into the housing recess 3, it will act on the inner periphery of the adapter ring 34 and widen it until there is engagement with the inner periphery 32 of the centering section 14. Accordingly the desired centering and supporting function is ensured The preferred design indicated in the drawing of the attachment means 22 provides a support sleeve 38 inserted into the attachment section 23, which is fashioned with a coaxially aligned holding ring 42 more particularly at its end portion facing the sealing ring 16. The holding ring 42 is best a resiliently elastic component, preferably of metal, whose radially outer edge portion 43 bears against the support sleeve 38 and whose radially inner portion functions as a clamping section 44, which defines a clamping cross section having a smaller outer cross section than the outer cross section of the fluid line 6. The clamping section 44 is able to be pivoted in relation to the support sleeve 38 while simultaneously changing the delimited clamping cross section.

The holding ring 42 is preferably held between the support sleeve 38 and its support ring 45 which is arranged to precede it coaxially in an axially inward direction. The support ring 16 acts simultaneously on the sealing ring 16 in the axial direction so that between the support ring 45 and the first step 15 it is held to be axially immovable.

On insertion of the fluid line 6 the holding ring 42 is elastically widened at the clamping section 44 so that it acts with its return force in a clamping manner on the outer periphery in the fluid line 6 and same is prevented from being pulled out.

For releasing the connection an axially moving release sleeve 47 is arranged in the support sleeve 38, its relative axial movement being indicated by the double arrow 46. The release sleeve has an actuating section 48 extending at the outer face 4 axially from the support sleeve 38 and possesses a thrust section 52 at the opposite end, such thrust section being axially opposite to the clamping section 44.

If an axially inward directed force is exerted on the actuating section 48 the release sleeve 47 is shifted inward and its thrust section 52 is pushed against the clamping section 44, which accordingly is pivoted and is moved clear of the outer periphery of the fluid line 6. The latter may accordingly be withdrawn from the attachment means 22.

The clamping section 44 preferably possesses several claws spaced-apart in the circumferential direction.

In order to adapt the respective housing recess 3 for the connection of fluid lines of different diameter it is an advantage for the attachment means 22 to be detachably secured to the housing 2. Two possible ways of accomplishing this appear in FIGS. 1 and 2.

In the case of both working examples the fixation of the attachment means 22 is implemented by a detachable connection between the support sleeve 38 and the housing 2. The support sleeve 38 is in each case held releaseably in the housing recess 3.

In the working embodiment illustrated FIG. 1 the support sleeve 38 is a plug-in part, which without any screwing operation may be plugged into the attachment section 23 axially from the outside and when necessary may also be drawn out again. On the outer periphery each support sleeve 38 is provided with an-annular groove 53, which in the inserted condition of the support sleeve 38 is at the same level as two slots lying in front of and behind the plane of the drawing, which open peripherally in the attachment section 23. The slots result from two holes extending through the housing 2 and parallel to each other and which are aligned like secants through the attachment section 23.

After the support sleeve 38 has been inserted into the attachment section 23 a U-shaped holding clamp 54 is inserted in the housing 54, whose two limbs 55 flank the support sleeve 38 at diametrically opposite sides and fit into the holes in the housing while extending adjacent to the said slots radially from the outside into the attachment section 23. In this case the clamp arms 55 are inserted simultaneously in an interlocking manner into the annular grooves 53 and ensure that the support sleeve 38 is held immovably in the interior of the attachment section 23.

If the housing recess 3 is to be adapted it is only necessary to pull out the holding clamps 54 so that the support sleeve 38 is released and may be withdrawn. The sealing ring 16 and the adapter ring 34 may then also be replaced, removed or inserted.

In the working embodiment illustrated in FIG. 2 the detachable mounting of the support sleeve 38 is by using a screw connection 58. The attachment section 23 is provided with a female screw thread into which the support sleeve 38 provided with a complementary male thread may be screwed.

In the working embodiment illustrated in FIG. 2 the depth of insertion for fitting the support sleeve 38 is set by an annular collar 56, which is molded on the outer axial end of the support sleeve 38 and runs on the outer face 4. This annular collar 56 may furthermore be provided with an outer polygonal shape to which a wrench may be applied.

In the working embodiment illustrated in FIG. 1 the attachment section 23 is internally stepped so that there is an abutment shoulder 57 against which the support sleeve 38 may bear axially.

The invention claimed is:

1. A connection device for fluid lines comprising:
   a housing in which at least one housing recess is formed stepped in the longitudinal direction and merging at an inner end thereof with a fluid duct,
   an attachment means for attachment of a fluid line, said attachment means means being fixed in the housing recess and defining a passage opening rendering possible the plugging into position of a fluid line to be connected, and
   a seal and adapter component disposed in the housing recess, the seal and adapter component including a sealing ring portion being associated with said attachment means and an adapter ring portion, said sealing ring portion having an inner periphery matching the outline of the fluid line to be connected and being penetrated by the fluid line when connected, said sealing ring portion further having an outer periphery stepped in a radially outward direction with respect to a maximum outer periphery of said adapter ring portion,
   wherein a centering section of the housing recess is disposed axially within the housing from the attachment means, into which centering section the end section of the connected fluid line extends while simultaneously being transversely supported when inserted
   wherein said adapter ring portion is able to be inserted into the centering section for bridging over any radial intermediate space which dependent on the outer diameter of the fluid line is eventually present between the outer periphery of the line's end section and the inner periphery of the centering section, and
   wherein the sealing ring portion precedes the attachment means in an axially inward direction and makes sealing contact with a wall of the attachment means, and
   wherein the centering section adjoins a seal receiving section in an axially inward direction, said seal receiving section being bounded by a radial step formed in said housing and having a radial cross-section larger than a constant maximum cross-section of the centering section, said seal receiving section receiving said sealing ring portion.

2. The connection device as set forth in claim 1, wherein the seal and adapter component is a component separate from the attachment means and not fixed to the attachment means.

3. The connection device as set forth in claim 1, wherein the adapter ring portion defines a collar which extends away from the sealing ring portion.

4. The connection device as set forth in claim 1, wherein the sealing ring portion and the adapter ring portion are integrally united with one another.

5. The connection device as set forth in claim 1, wherein when the line's end section is not inserted, the adapter ring portion has a shape tapering toward the end, opposite to the sealing ring portion, conically both as regards the outer periphery and the inner periphery, an annular gap being present between the outer periphery of the adapter ring portion and the inner periphery of the centering section, such gap having a wedge-shaped cross section so that the adapter ring portion is able to be widened by the fluid line to be inserted as far as engagement with the inner periphery of the centering section.

6. The connection device as set forth in claim 1, wherein the sealing ring portion consists of a material with elastic properties.

7. The connection device as set forth in claim 1, wherein the adapter ring portion consists of a material with elastic properties.

8. The connection device as set forth in claim 1, having a plurality of housing recesses with a mutually identical configuration, whose centering sections have the same inner diameter.

9. The connection device as set forth in claim 1, wherein the attachment means possesses a support sleeve secured in the housing recess, such sleeve being fashioned with a coaxially arranged holding ring through which the connected fluid line extends when inserted and which acts on the inserted fluid line's outer periphery with a holding function.

10. The connection device as set forth in claim 9, comprising a release sleeve axially sliding in the support sleeve protruding axially from the support sleeve and able to be thrust from the outside against the holding ring in order to release its holding action on the inserted fluid line.

11. The connection device as set forth in claim 9, wherein the support sleeve is releaseably held in the housing recess.

12. The connection device as set forth in claim 11, wherein the support sleeve possesses a male thread and is screwed into the housing recess.

13. The connection device as set forth in claim 11, wherein the support sleeve is inserted into the housing recess without a screw connection and is held there by a holding clamp engaging the support sleeve at diametrically opposite positions in an interlocking manner, such clamp bearing against the housing.

14. The connection device as set forth in claim 1, wherein the attachment means is releaseably fixed in the housing recess.

15. The connection device as set forth in claim 1, wherein the housing is an integral component of a valve or a drive operated by fluid power.

16. A connection device for fluid lines comprising:

a housing having a recess stepped in an axial direction, said recess including a recess section, a seal receiving section and a centering section, said centering section and said seal receiving section being bounded by a first radial step, wherein said centering section has a constant maximum radial cross-section smaller than a constant maximum radial cross-section of said seal receiving section and said seal receiving section and said recess section being bounded by a second radial step, wherein said seal receiving section has a constant maximum radial cross-section smaller than a constant maximum radial cross-section of said recess section;

an attachment means for attachment of a fluid line, said attachment means seated in said recess section, said attachment means having a passage opening for receiving a fluid line; and a seal and adapter component, said seal and adapter component including a sealing ring portion seated in said seal receiving section and making contact with said attachment means, and an adapter ring portion seated in said centering section, said seal and adapter component having an inner periphery adapted in size to receive the fluid line in a sealing relationship and said sealing ring portion having an outer periphery stepped in a radially outward direction with respect to a maximum outer periphery of said adapter ring portion and said adapter ring portion terminating at said first radial step of said housing, wherein said adapter portion surrounds an inserted fluid line and remains intact with said sealing ring portion upon insertion of the fluid line in the connection device.

* * * * *